No. 682,185. Patented Sept. 10, 1901.
C. H. FITLER.
MACHINE FOR CUTTING AND SHAPING WOOD OR OTHER MATERIAL.
(Application filed Oct. 31, 1900.)
(No Model.) 6 Sheets—Sheet 3.

WITNESSES:
Walter C. Pusey
Helen D. Blackwood

INVENTOR:
Charles Henry Fitler,
BY Joshua Pusey,
ATTORNEY

No. 682,185.  
C. H. FITLER.  
MACHINE FOR CUTTING AND SHAPING WOOD OR OTHER MATERIAL.  
(Application filed Oct. 31, 1900.)  
(No Model.)

Patented Sept. 10, 1901.  
6 Sheets—Sheet 4.

WITNESSES:  
Walter C. Pusey  
Helen D. Blackwood.

INVENTOR:  
Charles Henry Fitler,  
BY  
Joshua Pusey,  
ATTORNEY

No. 682,185. Patented Sept. 10, 1901.
C. H. FITLER.
MACHINE FOR CUTTING AND SHAPING WOOD OR OTHER MATERIAL.
(Application filed Oct. 31, 1900.)
(No Model.) 6 Sheets—Sheet 6.

WITNESSES:
Walter C. Pusey.
Helen D. Blackwood.

INVENTOR:
Charles Henry Fitler,
BY Joshua Pusey,
ATTORNEYS

UNITED STATES PATENT OFFICE.

CHARLES HENRY FITLER, OF PHILADELPHIA, PENNSYLVANIA.

MACHINE FOR CUTTING AND SHAPING WOOD OR OTHER MATERIAL.

SPECIFICATION forming part of Letters Patent No. 682,185, dated September 10, 1901.

Application filed October 31, 1900. Serial No. 35,013. (No model.)

*To all whom it may concern:*

Be it known that I, CHARLES HENRY FITLER, a citizen of the United States, residing in the city and county of Philadelphia and State of Pennsylvania, have invented certain new and useful Improvements in Machines for Cutting and Shaping Wood, &c., of which the following is a full, clear, and exact description, reference being had to the accompanying drawings.

This invention relates to machines for cutting and shaping wood and other material, and particularly to that class of machines in which revolving cutters are moved at certain intervals and for certain periods into and from engagement with the revolving material in a manner to fashion the latter into prescribed designs or patterns.

The object of my invention is to provide a novel construction and organization of mechanism including among other things a plurality of sets of cutters with independent controlling means therefor, together with means for presenting the material to the respective cutters at different stages of the operation, whereby a wider range than heretofore of ornamental and decorative work may be produced, as will be hereinafter set forth and claimed.

Figure 1:
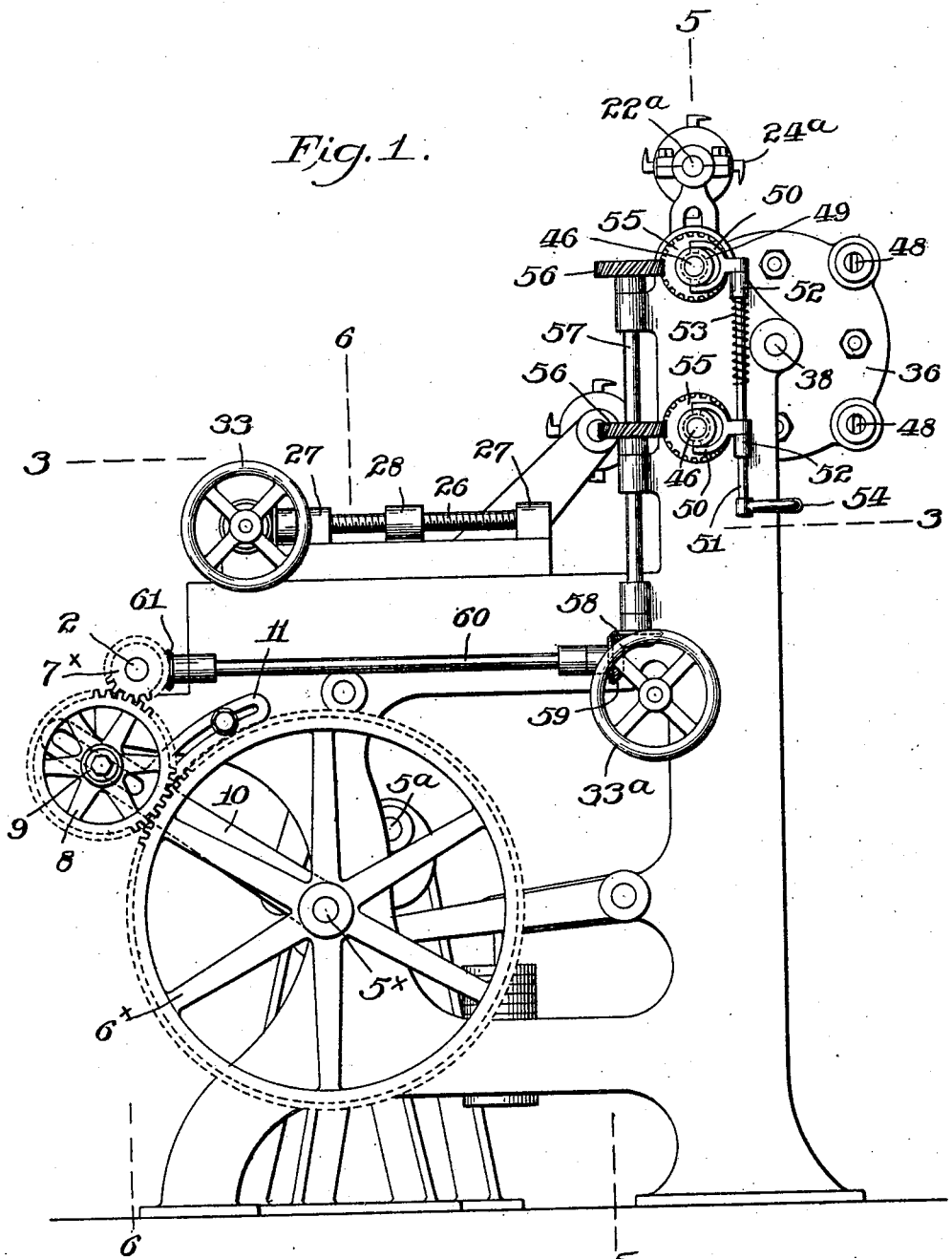
Figure 2:
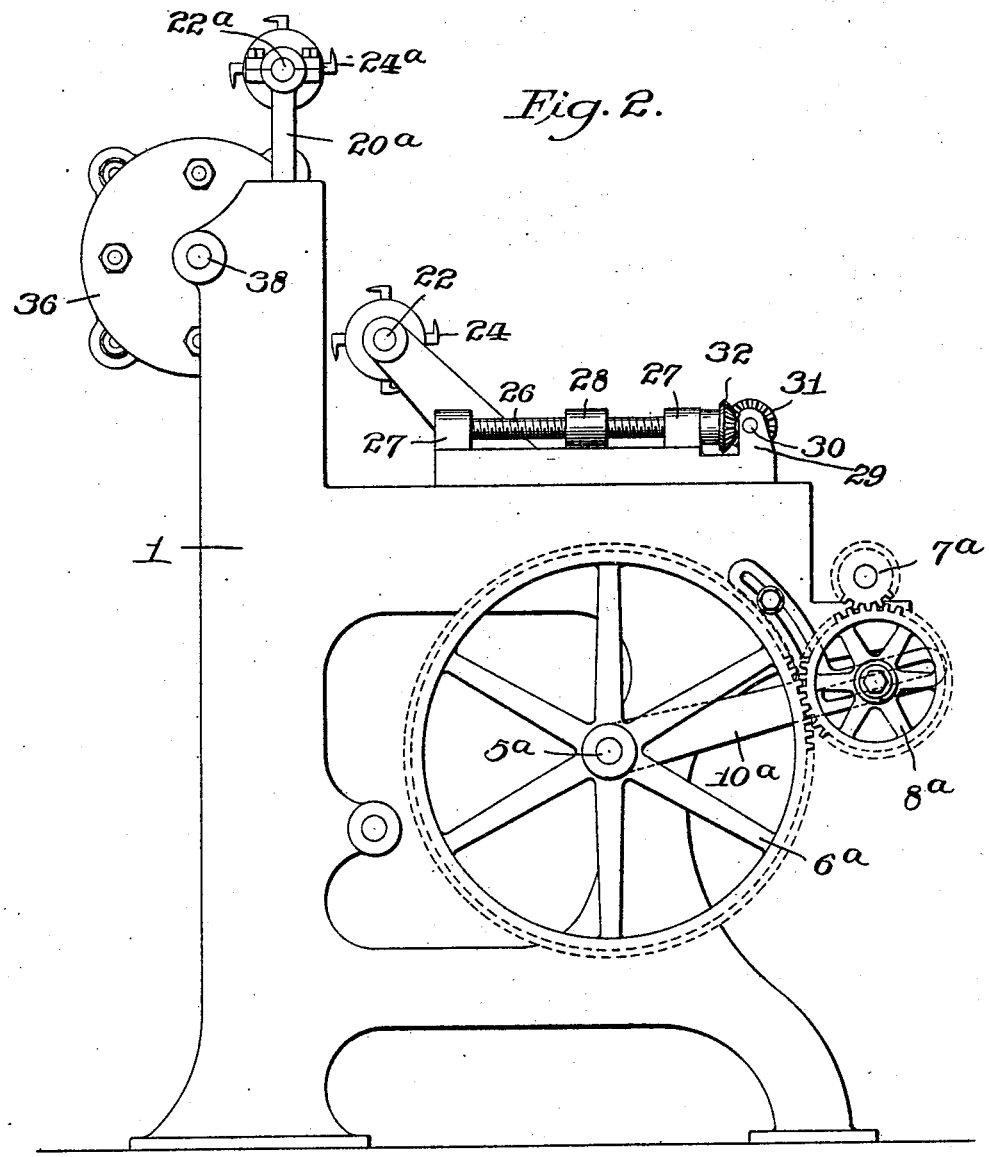
Figure 3:
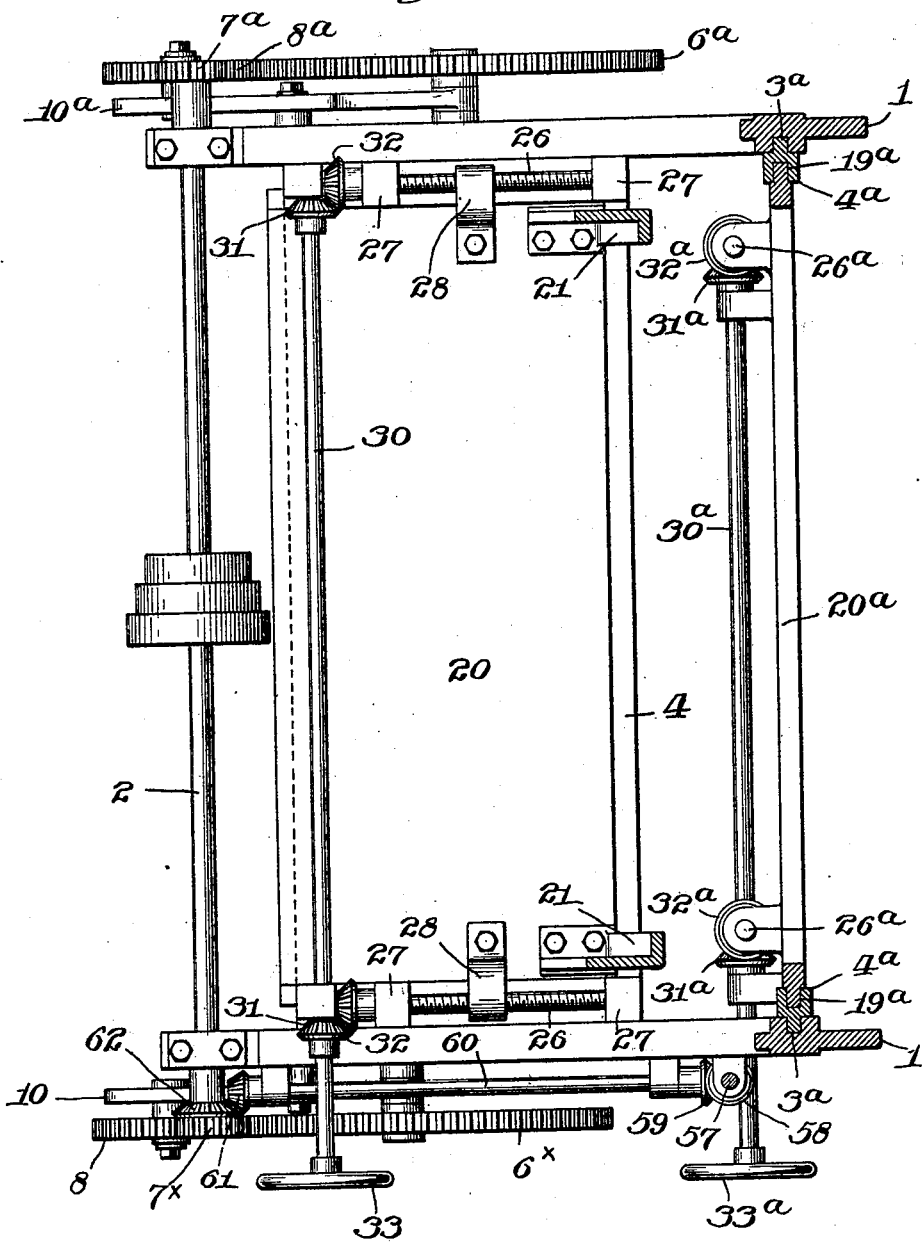
Figure 4:
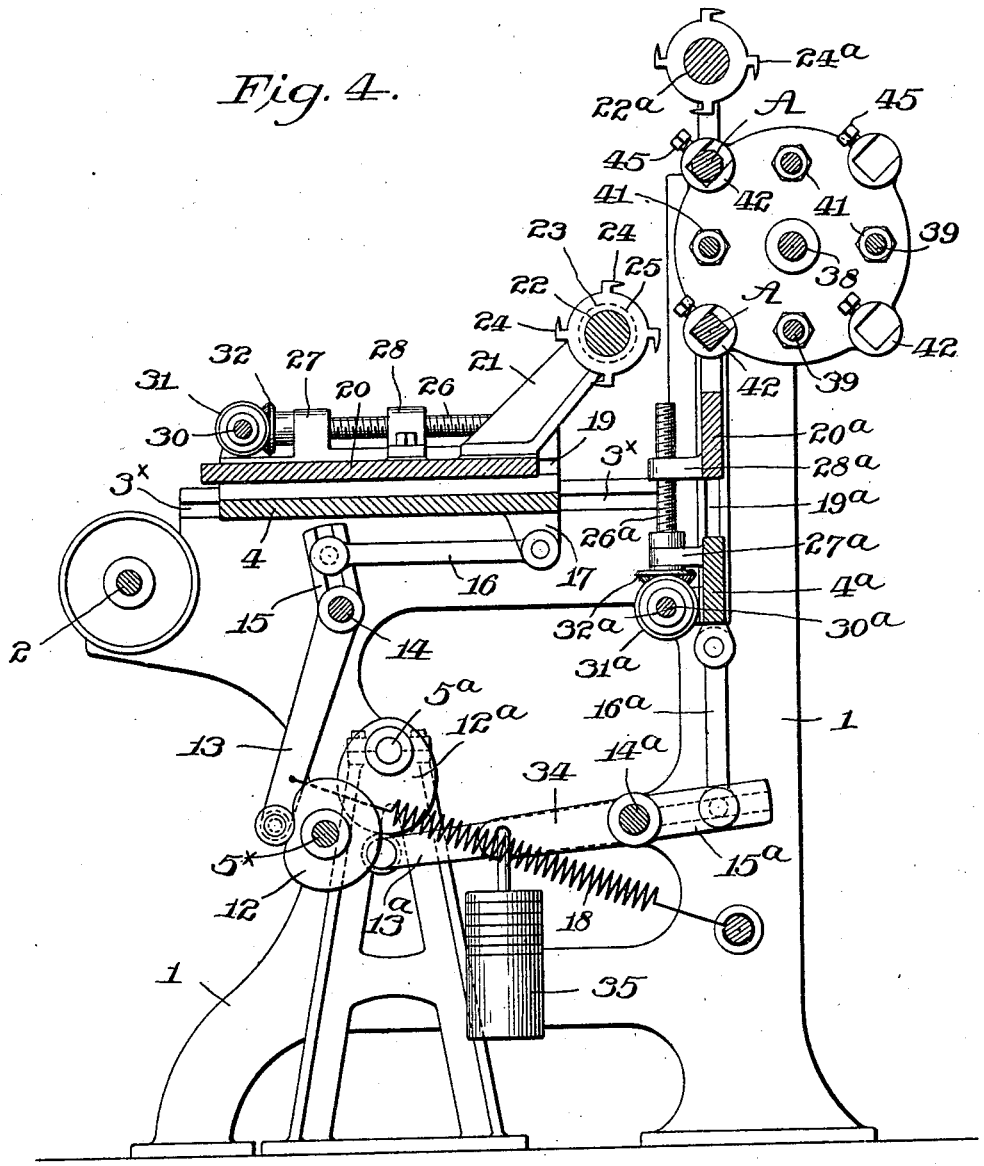
Figure 5:
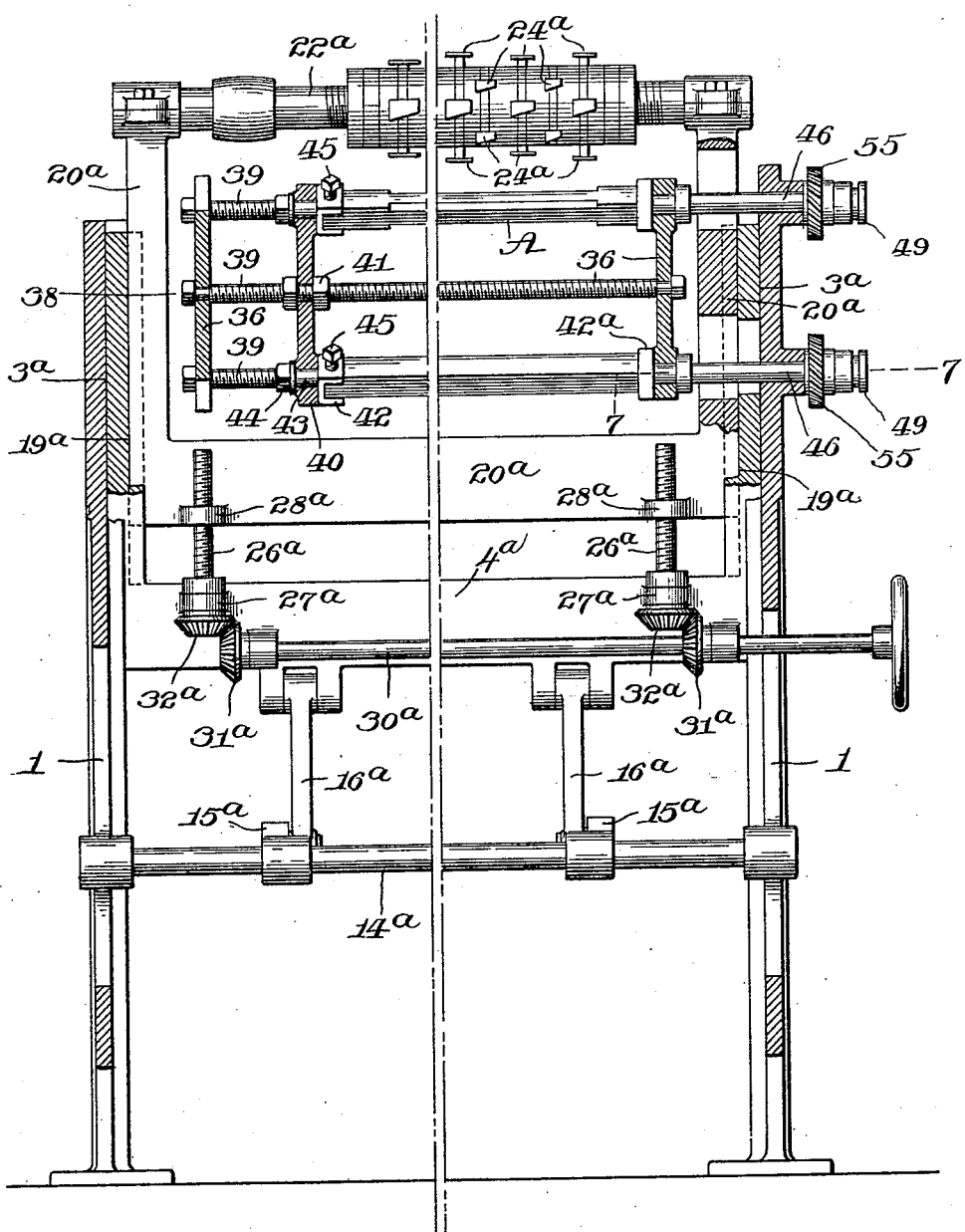
Figure 6:
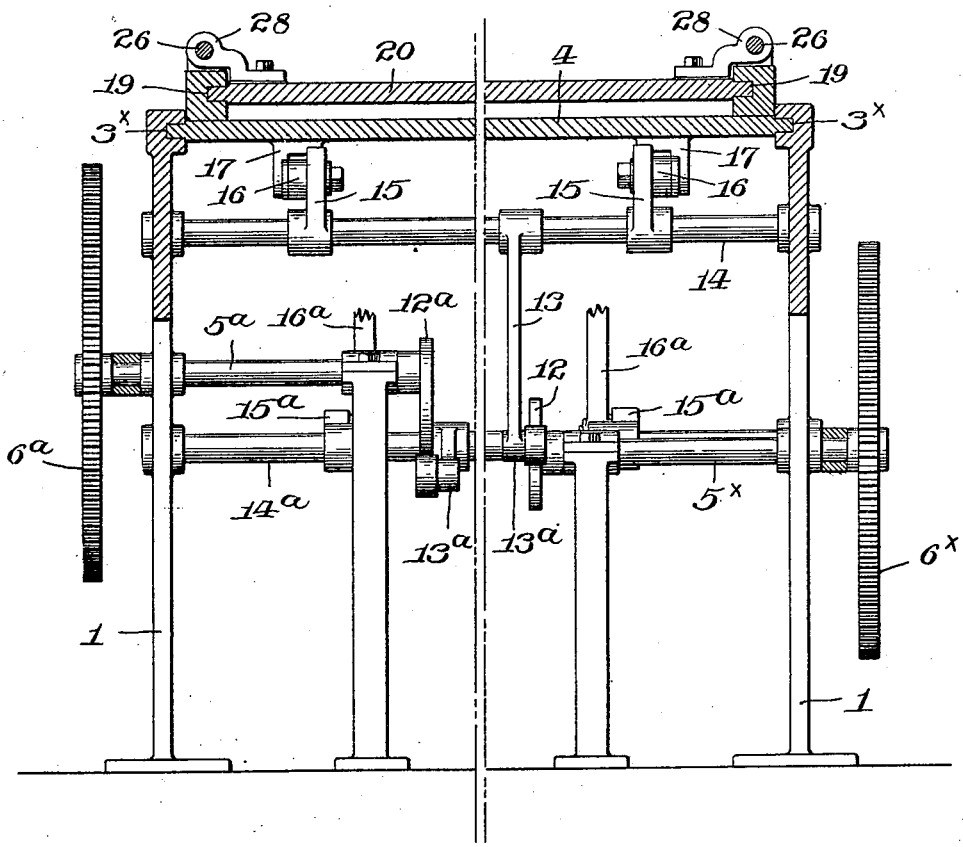
Figure 7:
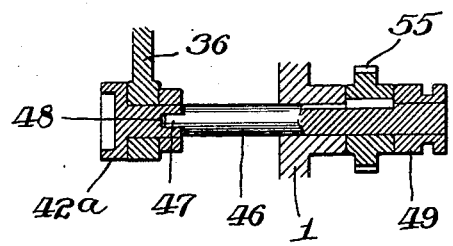

In the drawings, Figure 1 is an elevation of the right-hand end of the machine. Fig. 2 is an elevation of the left-hand end thereof. Fig. 3 is a sectional plan, as on the line 3 3 of Fig. 1. Fig. 4 is a transverse vertical section of the machine. Fig. 5 is a longitudinal vertical section, as on the line 5 5 of Fig. 1. Fig. 6 is a similar section, as on the line 6 6 of Fig. 1. Fig. 7 is a sectional detail, as on the line 7 7 of Fig. 5.

1 is the main supporting-frame, and 2 the driving-shaft, journaled in suitable boxes therein. Slidingly fitted to horizontal guideways $3^\times$ in the side members of the frame is a reciprocative bed 4, the movements of which are effected and controlled through correlated differential gear and cam mechanisms, which together constitute what may be termed a "prescription," as follows: Mounted in the main frame parallel to and below the main shaft is a shaft $5^\times$, to one end of which is affixed a large spur-wheel $6^\times$. On the adjacent end of the main shaft is a pinion $7^\times$, which is geared with the wheel $6^\times$, through an interposed idler 8, whereby motion is transmitted from the main shaft to the shaft $5^\times$ at a prescribed rate of speed. The pinion and the idler are detachably mounted on their respective shafts that they may be readily removed and others of different diameters as readily substituted therefor to permit the regulation of the relative speeds of the two shafts as occasion may require. In the present instance the idler is loosely mounted on a stud 9, bolted adjustably to a slotted radius-bar 10. This bar is provided with the usual adjustable arc connection 11 for permitting its adjustment in respect to the driving-shaft to accommodate various idlers that may be employed to meet the different requirements of service. On the shaft $5^\times$ is detachably mounted a cam 12, upon the periphery of which bears a roller on the lower end of an arm 13, depending from a rock-shaft 14, mounted below the bed-plate. On this shaft are affixed near its respective ends two arms 15, which are connected, by means of links 16, with lugs 17 on the under side of the bed-plate. The arm 13 is held yieldingly in contact with the cam by a retracting-spring 18, secured thereto and to the main frame. Hence during the rotation of the cam the bed 4 is advanced and retracted at such times and to such limits as the conformation of the cam and its speed of rotation may determine. Mounted in horizontal guideways 19 in the sides of the bed 4 is an independently-movable bed 20, on which are rearwardly-inclined brackets 21, carrying boxes for the support of a horizontal cutter-bearing shaft 22. This shaft is provided with a pulley 23, which is belted with and driven from a suitable driving-pulley, so as to be rotated at a high rate of speed. On the shaft 22 are mounted a series of circular cutters 24, which during their rotation are moved by the reciprocating bed toward and from a stick of wood A or other material to be operated upon, such material being supported in the path of the cutters by a chuck-carriage, hereinafter described. The cutters are arranged diametrically opposite to each other, being welded to collars 25, which are fastened to the shaft 22. By reason of the high rate of speed at which the cutters are driven I have found that it is important that the cutters be arranged in pairs diametrically opposite to each other, so that they will be perfectly balanced in their rotation. The ends of the cutters are each curved in an arc concentric with their shaft, and the acting beveled edges of the cutters are, as seen in Fig. 5, slightly inclined to effect a shearing action on the material engaged thereby. During the reciprocations of the beds with the cutters the upper bed is gradually advanced independently of the lower bed by the attendant to cause the cutters to progressively act upon the material in their path. For this purpose a pair of screw-rods 26 are rotatably supported in boxes 27 at the respective ends of the lower bed and fitted to tapped brackets 28 on the upper bed. Journaled in boxes 29 at the respective ends of the lower bed is a longitudinal shaft 30, provided with bevel-wheels 31, that coact with corresponding wheels 32 on the adjacent screw-rods, so that if the shaft 30 be properly rotated by means of a hand-wheel 33 thereon the said rods will be simultaneously rotated in a manner to advance or retract the upper bed with its cutters, as desired. The material after being acted upon by the cutters is carried into the path of a set of secondary cutters $24^a$, which are operated independently of the set first described and are controlled by an entirely different "prescription" from that which controls the cutters 24. The secondary cutters may be caused to act upon the whole or a part of the previously-fashioned portion of the work, so as to modify or render still more complex the ultimate pattern or design, or the secondary cutters may be arranged to act upon a portion of the material not acted upon by the primary cutters, the finished product in the latter operation thus presenting at different portions of its length separate ornate shapes, which together may form a complete design. The secondary cutters are vertically movable toward and from the material, and they are mounted on and carried by a duplex bed construction under the control of an appropriate differential gear and cam mechanism, the mounting, with its adjusting devices, being substantially similar to that above described with respect to the primary cutters, excepting that in one case a vertical instead of a horizontal feed is employed, as follows: $4^a$ is a vertically-movable bed, substantially U-shaped, fitted to vertical guideways $3^a$ in the side members of the main frame. This bed is connected by means of links $16^a$ with rearwardly-extending arms $15^a$ on a rock-shaft $14^a$, journaled in boxes in the main frame, and this shaft is provided with a forwardly-extending arm $13^a$, that bears against an appropriate cam $12^a$ on a shaft $5^a$, journaled in the main frame. The shaft $5^a$ lies adjacent to the shaft $5^x$, but extends beyond the opposite sides of the main frame and is there geared with the driving-shaft through differential gearing of the kind above described with respect to the shaft $5^x$—viz., a spur-wheel $6^a$ and a detachable pinion $7^a$ and idler $8^a$, with an adjustable radius-bar $10^a$ for the idler. Fitted to vertical guideways $19^a$ in the side members of the bed $4^a$ is a supplemental bed $20^a$, in the upper portion of which is journaled the shaft $22^a$, carrying the secondary cutters $24^a$. These cutters, aside from the configuration of their working edges, are similar in their construction and mounting to the cutters first above described. The supplemental bed $20^a$ is independently adjustable vertically in the bed $4^a$, similarly to and for a like purpose as the supplemental bed for the primary cutters—that is, vertical screw-rods $26^a$ are journaled in boxes $27^a$ on the bed $4^a$ and fitted to tapped lugs or brackets $28^a$ on the supplemental bed, the lower ends of said screw-rods being provided with bevel-wheels $32^a$, which gear with corresponding wheels $31^a$ on a horizontal shaft $30^a$, journaled in bearings on the bed. The shaft $30^a$ is provided with a hand-wheel $33^a$ to facilitate its operation. On the rock-shaft $14^a$ is a forwardly-extending arm 34, from which is suspended an adjustable counterpoise 35 for the two vertically-movable beds and the parts supported thereon. The material to be operated upon is clamped in a rotary chuck-carriage at the rear of the machine, which carriage is so constructed and arranged that the material may be thereby directed to and supported in the path of the revolving cutters in succession. This carriage comprises two end heads or disks 36 37, centrally mounted on a longitudinally-disposed shaft 38, journaled in boxes in the rear portion of the main frame. These heads are connected by a series of screw-shafts 39, (in the present instance four,) arranged at regular intervals apart equidistantly from the axis of the carriage. On these screw-shafts is mounted a head 40, which may be adjusted lengthwise of the carriage by the manipulation of set-nuts 41 on the respective screw-shafts. On the inner face of the head 40, at or about its periphery, is a series of regularly-spaced chucks 42—in the present instance four. These chucks each comprise a socket provided with a shank 43, which is journaled in the head 40 and detachably held in place by a nut 44, screwed onto the projecting threaded end of the shank. In the wall of the socket is a set-screw 45, whereby the end of the material inserted in the socket may be firmly clamped. One side wall of the socket is open to facilitate the placing of the material therein. On the inner face of the end head 36 is a series of rotatable sockets $42^a$, corresponding in number and position with the sockets 42, above described, and adapted to receive and support the opposite ends of the material to be operated upon by the cutters. It will be seen that by adjusting the chuck-bearing head 40 lengthwise of the carriage material of different lengths may be mounted in the latter. The relative positions of the chucks in respect to the cutters are such that when one strip of material is presented to one set of cutters another strip is presented to the other set of cutters, the then rearward chucks being in convenient position for the introduction of material thereto. Consequently when the material has been shaped by the cutters if the chuck-carriage be properly turned manually by the attendant—viz., a quarter-turn—the material acted upon by the lower cutters will be withdrawn therefrom and presented to the upper cutters, a fresh stick will be presented to the lower cutters, and the material previously finished by the upper cutters will be withdrawn therefrom into convenient position for renewal by the attendant, and all this at one and the same time. Fresh sticks are periodically applied to the idle chucks by the attendant, and the chuck-carriage rotated by him as the cutters complete their work, and so on continuously.

The mechanism for revolving the material while the same is in the path of the cutters is as follows: Slidingly and rotatably fitted to bearings in the right-hand end of the main frame are two short shafts 46, which are axially in line with the shanks of the two adjacent chucks, supporting the material in the path of the respective cutters. On the inner ends of these shafts 46 are flat projections 47, which are adapted by longitudinal movement of the shafts to be engaged with and disengaged from sockets 48 in the opposing ends of the chuck-shanks. On the outer ends of the shafts 46 are keyed circumferentially-grooved collars 49, embraced by yokes 50, carried by a vertical rock-shaft 51, having its bearings in lugs 52 on the side of the main frame. Normally the shafts 46 are maintained in engagement with the sockets 48 of the chuck-shanks through the action of a torsional spring 53, which is secured to one of the lugs 52 and to the shaft 51. On the lower end of this shaft is a handle 54, by the manipulation of which said shaft may be turned in opposition to the spring to effect the release of the chucks. On the shafts 46 are splined spiral gears 55, which coact with corresponding gears 56 on a vertical shaft 57, having its bearings in lugs on the main frame. A bevel-wheel 58 on the lower end of this shaft 57 gears with a similar wheel 59 on the rearward end of a horizontal shaft 60, mounted in bearings on the side of the main frame. On the forward end of the shaft 60 is a bevel-wheel 61, which coacts with a similar wheel 62 on the main driving-shaft. By this system of gearing motion is transmitted from the main shaft to the two shafts 46. Hence if the latter shafts be engaged with the opposing shanks of the two chucks said chucks and perforce the material supported thereby will be continuously rotated. At the same time the chuck-carriage will be locked in place. Preparatory to the bodily turning of the chuck-carriage the shafts 46 are disengaged from the chuck-shanks by the attendant; but when the carriage has been reset the shafts are reëngaged with the then opposing chuck-shafts.

I claim—

1. In a machine of the character described, the combination with two sets of cutting devices, reciprocative supporting-beds therefor, differential gear and cam mechanisms, and operative connections between the same and the respective beds, of a shiftable carriage mounted in proximity to said devices and provided with chucks or holders for supporting material in the paths of the respective devices, whereby the said carriages may be shifted to transfer the material from one set of cutting devices to the other set, together with means for rotating said chucks or holders when they have been set in active relation to the cutting devices, substantially as described.

2. In a machine of the character described, the combination with two sets of cutting devices, reciprocative supporting-beds therefor, differential gear and cam mechanisms, and operative connections between the same and the respective beds, of a carriage rotatably mounted in proximity to said devices and provided with chucks or holders for supporting material in the paths of the respective devices, whereby the said carriage may be rotated to transfer the material from one set of cutting devices to the other set, together with means for rotating said chucks or holders when they have been set in active relation to the cutting devices, substantially as described.

3. In a machine of the character described, the combination with a set of cutting devices, a horizontally-reciprocative support therefor, and differential gear and cam mechanism for effecting and controlling the reciprocations of the said support, of a second set of cutting devices, a vertically-reciprocative support therefor, and differential gear and cam mechanism for effecting and controlling the reciprocations of the said support, together with a shiftable carriage mounted in proximity to the said cutting devices and provided with chucks or holders for supporting material in the paths of the respective devices, whereby the said carriage may be shifted, to transfer the material from one set of cutting devices to the other set, and means for rotating said chucks or holders, substantially as set forth.

4. In a machine of the character described, the combination with a horizontally-reciprocative bed, differential gear and cam mechanism for effecting and controlling the reciprocations thereof, a supplemental bed horizontally adjustable on the main bed, means for adjusting the supplemental bed, bearings on the latter bed, a cutter-shaft in said bearings, its cutters, and means for revolving said shaft, of a vertically-reciprocative bed, differential gear and cam mechanism for effecting and controlling the reciprocations thereof, a supplemental bed vertically adjustable on the vertically-reciprocative bed, means for adjusting the supplemental bed last named, bearings on the latter bed, a cutter-shaft in said bearings, its cutters, and means for revolving the shaft, a shiftable carriage mounted in proximity to the cutters and provided with chucks or holders for supporting material in the paths of the respective cutters whereby the said carriage may be shifted to transfer the material from one set of cutters to the other set, and means for rotating said chucks or holders, substantially as set forth.

5. In a machine of the character described, a rotary carriage provided with independently-revoluble chucks or work-holders, longitudinally-movable and revoluble shafts adapted to be engaged with and disengaged from the chucks or holders in axial alinement therewith, a rock-shaft, and connections between the same and the shafts first named whereby said first-named shafts may be shifted longitudinally, together with means for rotating said first-named shafts, substantially as set forth.

In testimony whereof I have hereunto affixed my signature this 13th day of October, A. D. 1900.

CHARLES HENRY FITLER.

Witnesses:
JOHN R. NOLAN,
WALTER C. PUSEY.